United States Patent

Schlennert et al.

[11] Patent Number: 5,591,787
[45] Date of Patent: Jan. 7, 1997

[54] HARD LEAD FOR A PENCIL

[75] Inventors: Barbara Schlennert, Grosshabersdorf; Gerhard Lugert, Nürnberg, both of Germany

[73] Assignee: A.W.-Faber Castell Unternehmensverwaltung GmbH & Co., Stein, Germany

[21] Appl. No.: 478,527

[22] Filed: Jun. 7, 1995

Related U.S. Application Data

[63] Continuation of Ser. No. 145,858, Nov. 5, 1993, abandoned.

[30] Foreign Application Priority Data

Nov. 11, 1992 [DE] Germany .............................. 9215344 U

[51] Int. Cl.⁶ .......................... C09D 13/00; C09K 11/06
[52] U.S. Cl. .......................... 523/164; 524/276; 524/322; 524/437; 524/444; 524/458; 524/460; 524/487; 252/301.35
[58] Field of Search ............................. 523/164; 524/437, 524/444, 458, 460, 322, 276, 487; 252/301.35

[56] References Cited

U.S. PATENT DOCUMENTS

| | | | |
|---|---|---|---|
| 2,280,988 | 4/1942 | Weiser | 523/164 |
| 2,784,164 | 3/1957 | Ahlman et al. | 523/164 |
| 3,057,806 | 10/1962 | Switzer | 252/301.35 |
| 3,821,157 | 6/1974 | Muller et al. | 523/164 |
| 5,300,538 | 4/1994 | Loftin | 523/161 |

FOREIGN PATENT DOCUMENTS

| | | |
|---|---|---|
| 0344379A2 | 12/1989 | European Pat. Off. . |
| 7830645 | 12/1979 | Germany . |
| 2038475 | 2/1990 | Japan . |

OTHER PUBLICATIONS

Database WPI, Section CH, Week 7751, Derwent Publications Ltd., London, GB; Class A84, AN 77-91096Y & JP-A-52 134 519 (Nagashima T) Nov. 10, 1977.

*Primary Examiner*—Paul R. Michl
*Assistant Examiner*—John J. Guarriello
*Attorney, Agent, or Firm*—Spencer & Frank

[57] ABSTRACT

A fluorescent color hard lead for color pencils and marking crayons includes a matrix comprised of at least one material selected from the group consisting of a fatty acid metal salt, a fatty acid ester, and a wax; a binder; and a filler which is aluminum silicate; and particles which are intimately mixed into the matrix and which are comprised of at least one synthetic polymer and at least one fluorescent dye with which the at least one synthetic polymer is dyed, the at least one synthetic polymer being selected from the group consisting of homopolymers from one monomer and copolymers from at least two monomers, the monomers being selected from the group consisting of acrylic acids, acrylates, acrylonitriles, and styrene, which monomers have been polymerized in an aqueous solution into which is added the at least one fluorescent dye to provide a dispersion, which dispersion is added to the matrix directly, wherein the dyed particles are uniformly distributed throughout the matrix whereby the fluorescent color hard lead is uniformly colored and produces uniformly colored lines in use.

17 Claims, No Drawings

HARD LEAD FOR A PENCIL

This Application is a continuation of application Ser. No. 08/145,858 filed Nov. 5, 1993, now abandoned.

BACKGROUND OF THE INVENTION

The invention relates to a hard pencil lead, particularly for colored pencils. Such hard leads, as they are disclosed, for example, in German Utility Model Patent 7,830,645, generally include a basic substance, i.e., a matrix, containing fatty acid derivatives and fillers. In order to attain a luminous color effect, luminous color pigments in the form of pastes or solids are mixed to the basic substances, for example the fluorescing dye pigments Yellow 101 (C. I. 48052) or Green (C. I. 74265). Hard leads are also known in which the coloring portion is composed of pigments containing polyester amide resin or resins based on formaldehyde.

These prior art hard leads have the drawback that they produce only a weakly colored line on so-called coated or varnished papers. Moreover, the transfer of the hard lead substance to the surface of the paper is not continuous so that interruptions in the line occur. In order to produce uniformly colored surfaces, for example to mark a portion of text, the lead must be guided repeatedly over the same portion of the paper. Another drawback of the prior art pencils is that their luminosity is lower compared to, for example, luminous color felt tip pens.

SUMMARY OF THE INVENTION

On this basis, it is an object of the invention to provide a hard lead which can be easily and uniformly used on coated papers and produces a colored marking of high luminosity. However, the line drawn by the hard lead should be such that it is thick enough to produce the desired luminosity and color saturation but, on the other hand, thin enough that text portions marked by it are still easily legible. A further object of the invention is to provide a hard lead which is suitable, in addition to coated papers, also for all other types of paper and particularly also for papers coated with a heat or pressure sensitive layer. This is accomplished by the invention wherein there is provided a luminous color hard lead composed of a substance based on fatty acid derivatives and/or waxes and a binder, with aluminum silicate being added to this substance as a filler and an aqueous dispersion of synthetic polymer particles as the coloring agent. The synthetic polymer particles are dyed with one or a plurality of fluorescent dyes and are homopolymers from one or copolymers from two or more monomers from the group including acrylic acid derivatives and styrene. With the lead according to the invention it is possible to produce brightly colored and fluorescent lines on the above-mentioned papers. Text portions written in water soluble inks can also be marked without smearing. In contrast to the prior art luminous color felt tip pens, pencils employing hard leads require higher pressure forces to produce a line on the paper. The lead according to the invention therefore has a consistency which, on the one hand, gives it a sufficiently high mechanical stability and, on the other hand, makes it soft enough not to injure sensitive papers such as thermal copier paper and carbon-backed papers. In that case, the dye could come in contact with the active substances of the coatings of these papers and could be changed in its color. The mentioned papers are also relatively thin and tear easily. Conventional hard leads often contain added pigments that were produced on the basis of polyester amide resin or resins based on formaldehyde. These pigments have a relatively great hardness and easily lead to damage of the surface of coated or varnished papers. In contrast thereto, the dye employed in the hard lead according to the invention is a dispersion of soft synthetic polymer particles which are dyed with a fluorescent dye and are composed essentially of homopolymers or copolymers of monomers from the group including acrylic acid derivatives and styrene. Such dispersions are known and are employed as marking fluids for felt-tip pens.

An advantageous composition for the synthetic polymer particles comprises copolymer acrylonitrile, acrylic or methacrylic acid and styrene. Another advantageous composition for the synthetic polymer particles includes a mixture of two different copolymers, with one copolymer being composed of methacrylonitrile and methacrylic acid and another copolymer being composed of glycidyl methacrylate and methacrylate and styrene. Additionally, yet another advantageous composition includes the latter mixture of two different copolymers combined with synthetic polymer particles comprised of copolymers of acrylonitrile, acrylic or methacrylic acid and styrene. It has been found that particularly uniform and colorful lines can be drawn if the synthetic polymer particles of the dispersion added to the basic substance of the lead have grain sizes between 0.2 µm and 6 µm.

The dyes for the synthetic polymer particles include, for example C. I. Basic Yellow 40 and C. I. Basic Red 1, which ensure easy dying of the synthetic polymer particles and impart high luminosity to the hard lead.

The further advantageous compositions of the basic substance of the hard lead and advantageous total recipes are described below.

DETAILED DESCRIPTION OF THE PREFERRED EMBODIMENTS

The invention will now be described in greater detail with reference to examples thereof.

EXAMPLE 1

| | |
|---|---|
| methyl cellulose | 6 g |
| calcium stearate | 24 g |
| aluminum silicate | 60 g |
| stearic acid ethyl ester | 80 g |
| Dispersion 1 | 75 g |

Dispersion 1 has a solids content of about 40 weight %. The synthetic polymer particles contained therein are essentially composed of a mixture of a glycidyl methacrylatemethyl methacrylate styrene copolymer and a methacrylonitrile methacrylic acid copolymer. To stabilize the dispersion and as wetting agents, substances such as sodium lauryl sulfate, polyoxyethylene and sodium dihexyl sulfosuccinate may be added. Their total proportions, when added together, make up a maximum of 10 weight % of the dispersion. As a further additive it contains a humectant, such as, for example, propylene glycol, in a proportion of up to 20%.

Dispersion 1 is obtained in the usual manner in that the monomers are polymerized in an aqueous solution with the addition of the above-mentioned dispersants and possibly with the addition of a starter, such as persulfate or hydrogen peroxide. In the present example, the monomers were added in equal proportions. However, the mixing ratio of the monomers may be varied within broad ranges. The particle size of the resulting synthetic polymer dispersion should lie approximately between 0.2μ and 6μ. The manufacture of such dispersions which, by the way, are also commercially available, is described in detail in European Patent 0,344,379. Finally, the synthetic polymer particles are dyed by adding a dye mixture composed of the basic dyes C. I. Basic Yellow 40, C. I. Basic Red 1 and C. I. Basic Violet 11.

The components listed in the recipe of Example 1 are intimately mixed in the usual manner in a mixer or kneader. The resulting paste is then extruded into strands which are cut into certain lengths and dried. The dried cut pieces may then be further processed into plastic or wood encased pencils. However, thicker strands may also be extruded, for example, for the manufacture of marking crayons or the like.

EXAMPLE 2

| | |
|---|---|
| methyl cellulose | 6 g |
| aluminum palmitate | 6.4 g |
| aluminum silicate | 35 g |
| oleic acid ethyl ester | 28.6 g |
| Dispersion 2 | 60 g |

Dispersion 1 in Example 2 is obtained by the copolymerization of the monomers acrylonitrile, methacrylic acid and styrene. Here again it is possible to vary the component proportions within wide limits without significantly changing the characteristics of the later synthetic polymer dispersion. This dispersion can also be obtained commercially in similar form so that, under certain circumstances, it may not be necessary to produce it. In a further step, the synthetic polymer particles are dyed with the dye called C. I. Basic Yellow 40. The same substances as in Example 1 are added as dispersants and humectants. The further processing also corresponds to that of Example 1.

We claim:

1. A fluorescent color hard lead for color pencils and marking crayons, comprising:
   (a) a matrix comprised of at least one material selected from the group consisting of a fatty acid metal salt, a fatty acid ester, and a wax; a binder; and a filler which is aluminum silicate; and
   (b) particles which are intimately mixed into the matrix and which are comprised of at least one synthetic polymer and at least one fluorescent dye with which the at least one synthetic polymer is dyed, the at least one synthetic polymer being selected from the group consisting of homopolymers from one monomer and copolymers from at least two monomers, the monomers being selected from the group consisting of acrylic acids, acrylates, acrylonitriles, and styrene, which monomers have been polymerized in an aqueous solution into which is added the at least one fluorescent dye to provide a dispersion, which dispersion is added to the matrix directly,
   wherein the dyed particles are uniformly distributed throughout the matrix whereby the fluorescent color hard lead is uniformly colored and produces uniformly colored lines in use.

2. A hard lead according to claim 1, wherein the at least one synthetic polymer comprises at least one copolymer of monomers selected from the group consisting of acrylonitrile, acrylic acid, methacrylic acid, and styrene.

3. A hard lead according to claim 1, wherein the particles of at least one synthetic polymer comprise a mixture of two different copolymers, one copolymer being composed of the monomers methacrylonitrile and methacrylic acid, and another copolymer being composed of the monomers glycidyl methacrylate, methacrylate and styrene.

4. A hard lead according to claim 3, wherein the at least one synthetic polymer further comprises at least one copolymer of monomers selected from the group consisting of acrylonitrile, acrylic acid, methacrylic acid, and styrene.

5. A hard lead according to claim 1, wherein the particles have grain sizes which range from 0.2 μm to 6 μm.

6. A hard lead according to claim 5, wherein the at least one fluorescent dye is a mixture of dyes selected from the group consisting of C.I. Basic Yellow 40, C.I. Basic Red 1, and C.I. Basic Violet 11.

7. A hard lead according to claim 5, wherein the at least one fluorescent dye is C.I. Basic Yellow 40.

8. A hard lead according to claim 1 wherein the dispersion has a solids content ranging between 20% to 50%.

9. A hard lead according to claim 8, wherein the binder is an alkyl cellulose.

10. A hard lead according to claim 1, wherein the at least one material of the matrix is selected from the group consisting of at least one fatty acid ester and at least one fatty acid metal salt having cations from groups IA, IIA and IIIB of the Periodic Table of Elements.

11. A hard lead according to claim 1, and having a composition (in weight %) as follows:
   from 0.5 to 10% of the binder;
   from 20 to 70% of the at least one material selected from the group consisting of a fatty acid metal salt and a fatty acid ester;
   from 5 to 60% of the filler; and
   from 5 to 50% of the particles of at least one synthetic polymer.

12. A hard lead according to claim 11, and having a composition (in weight %) as follows:
   3.0% of methyl cellulose;
   12.0% of calcium stearate;
   30.0% of aluminum silicate;
   40.0% of stearic acid ethyl ester; and
   15.0% of the particles of at least one synthetic polymer and at least one fluorescent dye, the at least one synthetic polymer comprising a copolymer of the monomers methacrylonitrile and methacrylic acid, and a copolymer of the monomers glycidyl methacrylate, methyl methacrylate and styrene; and the at least one fluorescent dye being a mixture of C.I. Basic Yellow 40; C.I. Basic Red 1; and C.I. Basic Violet 11.

13. A hard lead according to claim 11, having a composition (in weight %) as follows:
   6.0% of methyl cellulose;
   6.4% of aluminum palmitate;
   35.0% of aluminum silicate;
   28.6% of oleic acid ethyl ester; and
   24.0% of the particles of at least one synthetic polymer and at least one fluorescent dye, the at least one synthetic polymer comprising a copolymer of the monomers acrylonitrile, methacrylic acid and/or acrylic acid, and styrene, and the at least one fluorescent dye being C.I. Basic Yellow 40.

14. A hard lead according to claim 1, wherein the particles further comprise at least one additive selected from the group consisting of an humectant, a dispersant, and a wetting agent.

15. A hard lead according to claim 14, wherein the humectant is propylene glycol.

16. A hard lead according to claim 14, wherein the wetting agent is at least one wetting agent selected from the group consisting of sodium lauryl sulfate, polyoxyethylene (23)-lauryl ether, and sodium dihexyl sulfosuccinate.

17. A process for producing a fluorescent color hard lead for color pencils and marking crayons, comprising:
   a. admixing at least one material selected from the group consisting of a fatty acid metal salt, a fatty acid ester, and a wax; a binder; and a filler which is aluminum silicate to provide a matrix;
   b. polyerizing monomers selected from the group consisting of acrylic acids, acrylates, acrylonitriles, and styrene in aqueous solution thereof to provide a dispersion of particles of at least one synthetic polymer selected from the group consisting of homopolymers from one monomer and copolymers from at least two monomers in water;
   c. adding at least one fluorescent dye to the dispersion to dye the particles of the at least one synthetic polymer; and
   d. coloring the matrix by directly adding the dispersion thereto whereby the fluorescent color hard lead is uniformly colored.

* * * * *